United States Patent Office 3,473,866
Patented Oct. 21, 1969

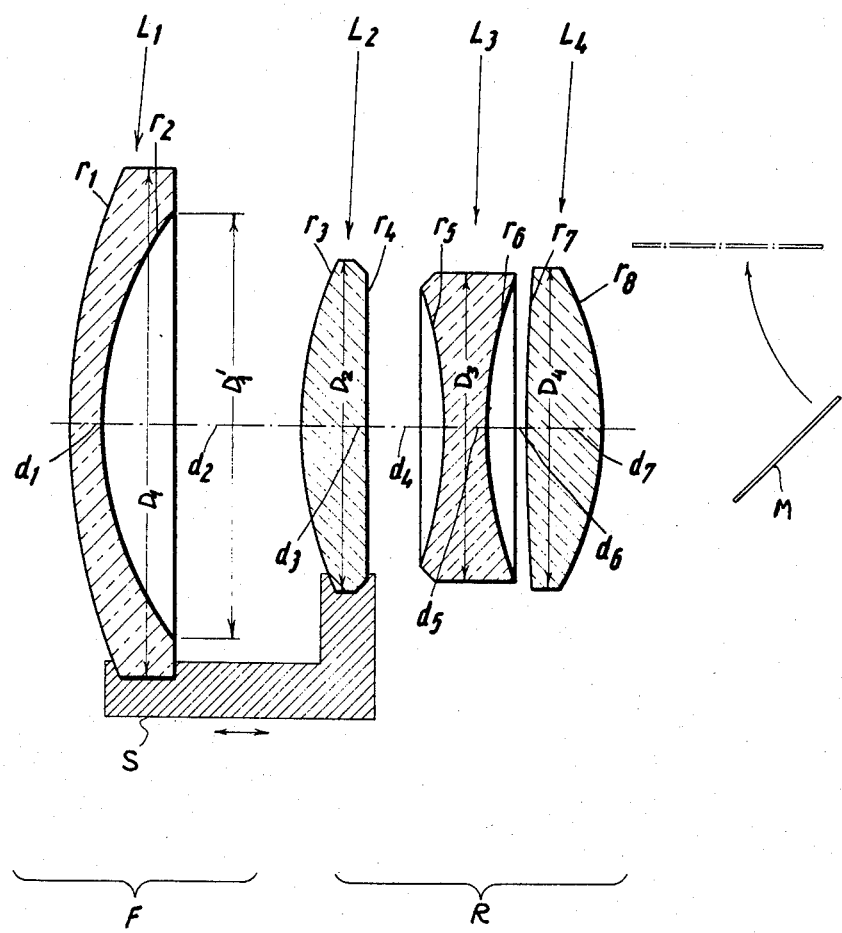

3,473,866
FOUR-ELEMENT PHOTOGRAPHIC OBJECTIVE FOCUSED BY DISPLACEMENT OF THE FRONT TWO ELEMENTS
Kurt Kirchhoff, Hamburg-Lurup, Germany, assignor to ISCO Optische Werke G.m.b.H., Gottingen, Germany, a corporation of Germany
Filed Mar. 15, 1968, Ser. No. 713,374
Claims priority, application Germany, Mar. 30, 1967, J 33,335
Int. Cl. G02b 9/34
U.S. Cl. 350—220       5 Claims

ABSTRACT OF THE DISCLOSURE

Optical objective for photographic or cinematographic camera, especially one of the reflex type, consisting of four air-spaced singlets of alternately negative and positive refractivity, the first two singlets being separated by a relatively wide air space and being joined for simultaneous axial displacement, with reference to the other two singlets, to focus the objective.

---

My present invention relates to an optical objective for photographic and cinematographic cameras, e.g., cameras of the reflex type wherein a deflecting mirror is interposable in the path of light rays for viewfinding and focusing purposes.

Such objectives should have a back-focal length which is large compared to their overall focal length, preferably exceeding the latter, in order that the pathway of the light rays beyond the last vertex should be long enough to accommodate the mirror if the camera is of the wide-angle type and, therefore, of relatively short focal length. Objectives of this description have heretofore been made bodily displaceable along the optical axis for focusing, e.g., with the aid of a worm drive engaging a holder for the entire lens assembly.

An object of my present invention is to provide an optical system of this general type which can be focused by the displacement of only some of the lenses, thereby simplifying the required adjustment mechanism.

It is also an object of this invention to provide a simple and relative inexpensive lens assembly which has the aforestated large ratio of back-focal length to overall focal length and which produces pictures of good quality with minimum aberrations.

I have found, in accordance with this invention, that the aforestated objects my be realized by the provision of four air-spaced lens members of alternately negative and positive refractivity, beginning with a negative front member, this front member being separated by a relatively large air space (wider than either of the other air spaces of the system) from the positive second member and being jointly displaceable therewith, relatively to the third and fourth members, for the purpose of focusing.

The several lens members of such an objective may all be singlets and, advantageously, are so dimensioned that the diameters of their curved surfaces do not exceed the respective radii of these surfaces, i.e., that each optically effective lens face should extend over an arc not greater than 60°. This angular limitation avoids the need for a separate surfacing of a peripheral zone of any lens face. With the radius of curvature of the forwardly convex front face of the first member ranging in magnitude between $0.5f$ and $f$ ($f$ being the overall focal length of the system), the diameter of that front face preferably is not greater than $f/2$.

The invention will be described in greater detail with reference to the accompanying drawing the sole figure of which illustrates, in axial section, a representative embodiment.

The objective shown in the drawing comprises a movable front component F and a stationary rear component R, the front component consisting of a meniscus-shaped, forwardly convex dispersive front lens $L_1$ with radii $r_1$, $r_2$ and thickness $d_1$ separated by a wide air space $d_2$ from a biconvex second lens $L_2$ with a more strongly curved front face having radii $r_3$, $r_4$ and thickness $d_2$. The rear component R, divided from the front component by a smaller air space $d_4$, consists of a biconcave third lens $L_3$ (radii $r_5$, $r_6$ and thickness $d_5$) separated by an air space $d_6$ from a biconvex fourth lens $L_4$ with a more strongly curved rear face (radii $r_7$, $r_8$ and thickness $d_7$).

Lenses $L_1$, $L_2$ are shown mounted in a common support S which can be axially shifted by conventional focusing means such as a threaded ring not shown. A mirror M behind the lens assembly directs incident light rays toward a viewfinder, also not shown, and may be tilted into an inoperative position as illustrated in dot-dash lines.

Front lens $L_1$ has an overall diameter $D_1$ which is smaller than its radius of curvature $r_1$, and, advantageously, is also less than 50% of the overall focal length $f$ of the objective; the diameter $D_1'$ of the rear face of this lens, similarly, is less than the radius $r_2$, and by the same token the diameters $D_2$, $D_3$, $D_4$ of the three other lenses are shorter than the smaller radii $r_3$, $r_5$ and $r_8$ thereof. The result is a highly compact assembly with limited optical aberrations.

The following table lists representative numerical values for the radii $r_1$ to $r_8$, the thicknesses and separations $d_1$ to $d_8$ and the surface powers $\Delta n/r$ of the illustrated system, together with the refractive indices $n_d$ for the yellow $d$-line of the spectrum and the dispersion ratios or Abbé numbers $v$. The linear parameters $r_1$ to $r_8$ and $d_1$ to $d_7$ are based on a magnitude of one linear unit for the overall focal length $f$; the objective has an aperture ratio of 1:3.5 and a back-focal length of 1.017 linear units.

TABLE

| Lens: | Radii | Thicknesses and Separations | $n_D$ | $v$ | $\Delta n/r$ |
|---|---|---|---|---|---|
| $L_1$ | $r_1=+0.6845$ | $d_1=0.0295$ | 1.52011 | 64.9 | +0.759877 |
|  | $r_2=+0.3700$ |  |  |  | −1.405535 |
|  |  | $d_2=0.2051$ | Air space |  |  |
| $L_2$ | $r_3=+0.3939$ | $d_3=0.0671$ | 1.72340 | 50.2 | +1.836478 |
|  | $r_4=-4.8516$ |  |  |  | +0.149106 |
|  |  | $d_4=0.0828$ | Air space |  |  |
| $L_3$ | $r_5=-0.4438$ | $d_5=0.0398$ | 1.66886 | 35.2 | −1.507235 |
|  | $r_6=+0.4567$ |  |  |  | −1.464556 |
|  |  | $d_6=0.0427$ | Air space |  |  |
| $L_4$ | $r_7=+2.0819$ | $d_7=0.0795$ | 1.62286 | 60.0 | +0.299172 |
|  | $r_8=-0.3366$ |  |  |  | +1.850715 |

The tabulated values (with $d_4$ relating to the infinity position) may vary within tolerances of ±20% for the radii $r_1$ to $r_8$, the thicknesses and separations $d_1$ to $d_7$ and the surface powers $\Delta n/r$, the tolerances for $n_d$ being ±0.02 and those for the Abbé numbers being ±5; in view of these tolerances, some of the decimals listed in the table for the sake of completeness are considered insignificant both for the preferred system and for the range of tolerances based thereon.

From the foregoing values we can calculate the center-to-center spacings $d_{1,2}$ (lenses $L_1$ and $L_2$), $d_{2,3}$ (lenses $L_2$ and $L_3$) and $D_{3,4}$ (lenses $L_3$ and $L_4$) as follows:

$$d_{1,2} = d_2 + (d_1 + d_3)/2 = 0.2534$$
$$d_{2,3} = d_4 + (d_3 + d_5)/2 = 0.1363$$
$$d_{3,4} = d_6 + (d_5 + d_7)/2 = 0.1024$$

From the foregoing numerical values it will be noted that the individual focal lengths of the lenses $L_1$, $L_2$, $L_3$ and $L_4$ have magnitudes of approximately $-0.6$, $+2$, $-3$ and $+2.1$, respectively. This proportioning of the individual focal lengths may also be modified within a tolerance limit of $\pm 20\%$ without significantly altering the optical qualities of the disclosed objective system.

I claim:

1. An optical objective consisting of four air-spaced lens members constituted by singlets of alternately positive and negative refractivity, including a negative front member and a positive second member, said front and second members being separated by an air space substantially wider than the other air spaces and being interconnected for joint axial displacement relative to the other two members; said front member, said second member, the third member and the fourth member having focal lengths in a proportion of substantially $$-0.6 : +2 : -3 : +2.1$$

the center-to-center spacing of said first and second members, said second and third members, and said third and fourth members being respectively equal to substantially 0.25, 0.14 and 0.10 based upon a numerical value of unity for the overall focal length of the objective.

2. An objective as defined in claim 1 wherein the optically effective faces of each member extend over a maximum arc of 60°.

3. An objective as defined in claim 1 wherein said front member has a diameter not exceeding 50% of the overall focal length of the objective.

4. An objective as defined in claim 3 wherein said front member is a forwardly convex meniscus, said second member is a biconvex lens with a more strongly curved forward face, said third member is a biconcave lens, and said fourth member is a biconvex lens with a more strongly curved rear face.

5. An objective as defined in claim 1 wherein said front member $L_1$, said second member $L_2$, said third member $L_3$ and said fourth member $L_4$ have radii of curvature $r_1$ to $r_8$ and thicknesses and separations $d_1$ to $d_7$ whose numerical values together with their refractive indices $n_d$ and Abbé numbers $v$ are substantially as given in the following table:

| Lens: | Radii | Thicknesses and Separations | $n_D$ | $v$ |
|---|---|---|---|---|
| $L_1$ | $r_1 = +0.68$ | | | |
| | | $d_1 = 0.03$ | 1.52 | 65 |
| | $r_2 = +0.37$ | | | |
| | | $d_2 = 0.21$ | Air space | |
| | $r_3 = +0.39$ | | | |
| $L_2$ | | $d_3 = 0.07$ | 1.72 | 50 |
| | $r_4 = -4.85$ | | | |
| | | $d_4 = 0.08$ | Air space | |
| | $r_5 = -0.44$ | | | |
| $L_3$ | | $d_5 = 0.04$ | 1.67 | 35 |
| | $r_6 = +0.46$ | | | |
| | | $d_6 = 0.04$ | Air space | |
| | $r_7 = +2.08$ | | | |
| $L_4$ | | $d_7 = 0.08$ | 1.62 | 60 |
| | $r_8 = -0.34$ | | | |

References Cited

UNITED STATES PATENTS

| 1,860,575 | 5/1932 | Gehrke | 350—255 |
| 2,503,789 | 4/1950 | Wood et al. | 350—255 |
| 2,725,789 | 12/1955 | Schlegel | 350—220 |
| 2,821,112 | 1/1958 | Lautenbacher et al. | 350—220 |

DAVID SCHONBERG, Primary Examiner

RONALD J. STERN, Assistant Examiner

U.S. Cl. X.R.

350—255